United States Patent
Kumra et al.

(10) Patent No.: US 12,152,522 B2
(45) Date of Patent: Nov. 26, 2024

(54) SYSTEMS AND METHODS FOR DETERMINING AMOUNT OF REDUCTANT DEPOSITS IN AFTERTREATMENT SYSTEMS

(71) Applicant: Cummins Emission Solutions Inc., Columbus, IN (US)

(72) Inventors: Anurag Kumra, Columbus, IN (US); Jinqian Gong, Columbus, IN (US); Arun Kumar Dasari, Indianapolis, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 556 days.

(21) Appl. No.: 17/599,437

(22) PCT Filed: Feb. 28, 2020

(86) PCT No.: PCT/US2020/020320
§ 371 (c)(1),
(2) Date: Sep. 28, 2021

(87) PCT Pub. No.: WO2020/205112
PCT Pub. Date: Oct. 8, 2020

(65) Prior Publication Data
US 2022/0178288 A1   Jun. 9, 2022

Related U.S. Application Data

(60) Provisional application No. 62/826,738, filed on Mar. 29, 2019.

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9418* (2013.01); *B01D 53/9431* (2013.01);
(Continued)

(58) Field of Classification Search
CPC combination set(s) only.
See application file for complete search history.

(56) References Cited

U.S. PATENT DOCUMENTS

2009/0158715 A1   6/2009   Stroh et al.
2011/0088372 A1   4/2011   Yamamoto
(Continued)

OTHER PUBLICATIONS

International Search Report and Written Opinion issued for PCT PCT/US2020/020320 issued May 18, 2020, 11 pages.

*Primary Examiner* — Binh Q Tran
(74) *Attorney, Agent, or Firm* — Foley & Lardner LLP

(57) ABSTRACT

An aftertreatment system comprises a selective catalytic reduction (SCR) unit, a reductant injector configured to insert reductant into the aftertreatment system, a first $NO_x$ sensor configured to measure an amount of $NO_x$ gases at a location upstream of the reductant injector, and a second $NO_x$ sensor configured to measure an amount of $NO_x$ gases at a location downstream of the SCR unit. A controller is programmed to estimate an amount of reductant deposits formed in the aftertreatment system based on at least the amount of $NO_x$ gases measured at the location upstream of the reductant injector, the amount of $NO_x$ gases measured at the location downstream of the SCR unit, and an amount of reductant that has been inserted into the aftertreatment system. The controller adjusts an amount of reductant to be inserted into the aftertreatment system based on the estimated amount of reductant deposits formed in the aftertreatment system.

20 Claims, 4 Drawing Sheets

(51) Int. Cl.
    *F01N 3/08*       (2006.01)
    *F01N 13/00*     (2010.01)

(52) U.S. Cl.
    CPC ....... B01D 53/9495 (2013.01); F01N 13/008 (2013.01); *B01D 2251/208* (2013.01); *F01N 3/0835* (2013.01); *F01N 3/0842* (2013.01); *F01N 3/2033* (2013.01); *F01N 2250/12* (2013.01); *F01N 2550/03* (2013.01); *F01N 2560/026* (2013.01); *F01N 2560/14* (2013.01); *F01N 2610/02* (2013.01); *F01N 2610/03* (2013.01); *F01N 2610/1453* (2013.01); *F01N 2900/0406* (2013.01); *F01N 2900/0412* (2013.01); *F01N 2900/0416* (2013.01); *F01N 2900/0418* (2013.01); *F01N 2900/0601* (2013.01); *F01N 2900/1402* (2013.01); *F01N 2900/1404* (2013.01); *F01N 2900/1614* (2013.01); *F01N 2900/1618* (2013.01)

(56) References Cited

U.S. PATENT DOCUMENTS

| | | | |
|---|---|---|---|
| 2012/0079813 A1* | 4/2012 | Sloane | F01N 3/208 60/276 |
| 2012/0216510 A1 | 8/2012 | Xu et al. | |
| 2015/0322837 A1* | 11/2015 | Takada | F01N 3/035 422/111 |
| 2016/0222850 A1* | 8/2016 | Ota | F01N 3/0814 |
| 2017/0145893 A1* | 5/2017 | Kidokoro | B01D 46/0036 |
| 2017/0292423 A1* | 10/2017 | Yoshida | F01N 3/0814 |
| 2017/0306818 A1* | 10/2017 | Ito | F01N 3/208 |
| 2017/0356322 A1 | 12/2017 | Farid et al. | |
| 2019/0360378 A1* | 11/2019 | Lee | F01N 3/208 |

* cited by examiner

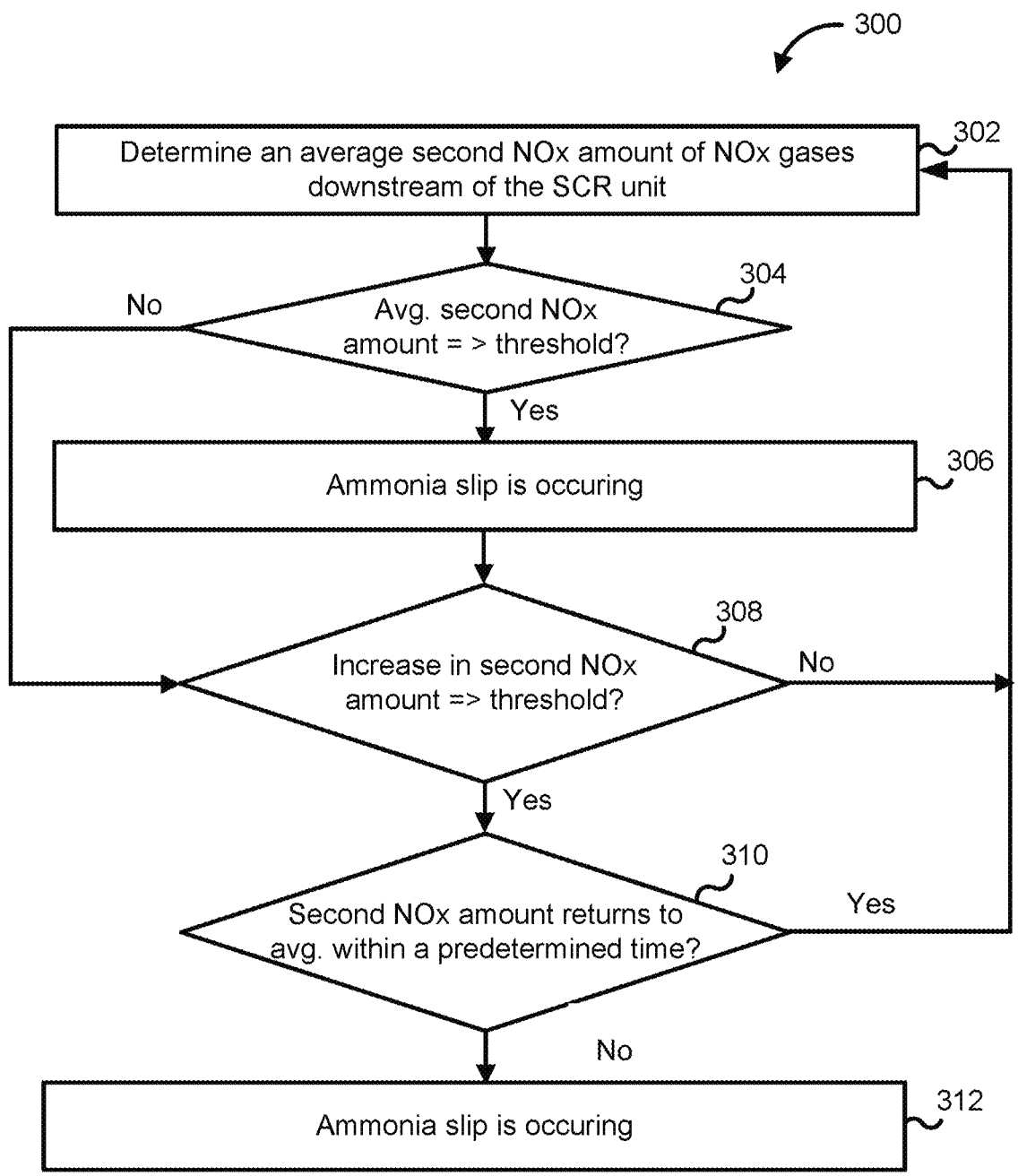

SYSTEMS AND METHODS FOR DETERMINING AMOUNT OF REDUCTANT DEPOSITS IN AFTERTREATMENT SYSTEMS

CROSS REFERENCE TO RELATED APPLICATIONS

The present application is a national stage of PCT Application No. PCT/US2020/020320, filed Feb. 28, 2020, which claims the benefit of U.S. Provisional Application No. 62/826,738, filed Mar. 29, 2019. The contents of these applications are incorporated herein by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally, exhaust gas aftertreatment systems comprise any of several different components to reduce the levels of harmful exhaust emissions present in exhaust gas. Aftertreatment systems may also include a selective catalytic reduction (SCR) system including a SCR catalyst formulated to decompose constituents of the exhaust gas such as nitrous/nitric oxides ($NO_x$) gases in the exhaust gas in the presence of a reductant. Over time, reductant deposits accumulate on sidewalls or components of the aftertreatment system, which increases backpressure on exhaust gas and decreases catalytic conversion efficiency of the SCR system. High temperature regeneration events are generally performed to remove these reductant deposits. Such high temperature regeneration events however, cause aging of the SCR catalyst and reduce an active life thereof.

SUMMARY

Embodiments described herein relate generally to systems and methods for accurately estimating an amount of reductant deposits formed within an aftertreatment system based on an amount of $NO_x$ gases in exhaust gas entering the aftertreatment system, an amount of $NO_x$ gases in exhaust gas exiting the aftertreatment system, and an amount of reductant that has been inserted into the aftertreatment system.

In some embodiments, an aftertreatment system comprises a selective catalytic reduction (SCR) unit; a reductant injector configured to insert reductant into the aftertreatment system; a first $NO_x$ sensor configured to measure an amount of $NO_x$ gases at a location upstream of the reductant injector; a second $NO_x$ sensor configured to measure an amount of $NO_x$ gases at a location downstream of the SCR unit; and a controller. The controller is programmed to: estimate an amount of reductant deposits formed in the aftertreatment system based on at least the amount of $NO_x$ gases measured at the location upstream of the reductant injector, the amount of $NO_x$ gases measured at the location downstream of the SCR unit, and an amount of reductant that has been inserted into the aftertreatment system by the reductant injector, and adjust an amount of reductant to be inserted into the aftertreatment system based on the estimated amount of reductant deposits formed in the aftertreatment system.

In some embodiments, the controller is further programmed to, in response to the amount of reductant deposits formed in the aftertreatment system being equal to or greater than a threshold amount, cause a hydrocarbon insertion assembly to insert hydrocarbons into the aftertreatment system to increase a temperature of the aftertreatment system to a regeneration temperature for removing the reductant deposits.

In some embodiments, the controller is configured to estimate the amount of reductant deposits using the following equation:

$$R_D = R_I - R_{(INOx-ONOx)}$$

where $R_D$ is the amount of reductant deposits formed in the aftertreatment system, $R_I$ is the amount of reductant that has been inserted into the aftertreatment system, and $R_{(INOx-ONOx)}$ is an amount of reductant that would be consumed to reduce the amount of $NO_x$ gases measured by the first $NO_x$ sensor to the amount of $NO_x$ gases measured by the second $NO_x$ sensor.

In some embodiments, the controller is configured to estimate the total amount of reductant deposits formed in the aftertreatment system at any given time using a free running counter that accumulates, sums, or integrates individual estimates of reductant deposits formed in the aftertreatment system over a period of time.

In some embodiments, the controller is programmed to: determine an ammonia slip parameter; and estimate the amount of reductant deposits formed in the aftertreatment system based on at least the amount of $NO_x$ gases measured at the location upstream of the reductant injector, the amount of $NO_x$ gases measured at the location downstream of the SCR unit, the amount of reductant that has been inserted into the aftertreatment system by the reductant injector, and the ammonia slip parameter.

In some embodiments, the controller is configured to determine the ammonia slip parameter based on a second $NO_x$ amount signal received from the second $NO_x$ sensor.

In some embodiments, the controller is configured to estimate the amount of reductant deposits using the following equation:

$$R_D = R_I - R_{(INOx-ONOx)} * ASP$$

Where, $R_D$ is the amount of reductant deposits formed in the aftertreatment system, $R_I$ is the amount of reductant that has been inserted into the aftertreatment system, ASP is the ammonia slip parameter, and $R_{(INOx-ONOx)} * ASP$ is an amount of reductant that would be consumed to reduce the amount of $NO_x$ gases measured by the first $NO_x$ sensor to the amount of $NO_x$ gases measured by the second $NO_x$ sensor.

In some embodiments, the controller is configured to: determine a temperature of the exhaust gas; estimate an amount of reductant deposits consumed based on the temperature of the exhaust gas; deduct the amount of reductant deposits consumed from the estimated amount of reductant deposits formed in the aftertreatment system; and adjust an amount of reductant to be inserted into the aftertreatment system based on the adjusted amount of reductant deposits In some embodiments, the controller is configured to: in response to the determining that the estimated amount of reductant deposits are being deposited at a faster deposition rate than a deposition rate threshold, instruct the reductant insertion assembly to reduce an amount of reductant inserted into the aftertreatment system.

In some embodiments, the controller is configured to: determine an average second $NO_x$ amount over time of $NO_x$ gases in the exhaust gas; and determine the ammonia slip parameter in response to the second $NO_x$ amount being equal to or greater than a threshold.

In some embodiments, the controller is configured to estimate the amount of reductant deposits formed based also on a catalytic conversion efficiency of the SCR unit.

In some embodiments, a method for estimating an amount of reductant deposits formed in an aftertreatment system comprising a reductant injector and a SCR unit located downstream of the reductant injector, comprises: receiving, by a controller, a first $NO_x$ amount signal from a first $NO_x$ sensor indicative of an amount of $NO_x$ gases at a location upstream of the reductant injector; receiving, by the controller, a second $NO_x$ amount signal from a second $NO_x$ sensor indicative of an amount of $NO_x$ gases at a location downstream of the SCR unit; determining, by the controller, an amount of reductant inserted that has been inserted into the aftertreatment system by the reductant injector; determining, by the controller, an estimated amount of reductant deposits formed in the aftertreatment system based on at least the first $NO_x$ amount, the second $NO_x$ amount, and the amount of reductant that has been inserted into the aftertreatment system; and adjusting, by the controller, an amount of reductant to be inserted into the aftertreatment system based on estimated amount of reductant deposits formed in the aftertreatment system.

In some embodiments, the method further comprises: in response to the amount of reductant deposits formed in the aftertreatment system being equal to or greater than a threshold amount, causing, by the controller a hydrocarbon insertion assembly to insert hydrocarbons into the aftertreatment system to increase a temperature of the aftertreatment system to a regeneration temperature for removing the reductant deposits.

In some embodiments, the estimated amount of reductant deposits are determined, by the controller, using the following equation:

$$R_D = R_I - R_{(INOx-ONOx)}$$

Where, $R_D$ is the amount of reductant deposits formed in the aftertreatment system, $R_I$ is the amount of reductant that has been inserted into the aftertreatment system, and $R_{(INOx-ONOx)}$ is an amount of reductant that would be consumed to reduce the amount of $NO_x$ gases measured by the first $NO_x$ sensor to the amount of $NO_x$ gases measured by the second $NO_x$ sensor.

In some embodiments, the method further comprises: determining, by the controller, an ammonia slip parameter; and determining, by the controller, an estimated amount of reductant deposits formed in the aftertreatment system based on at least the first $NO_x$ amount, the second $NO_x$ amount, the amount of reductant that has been inserted into the aftertreatment system by the reductant injector, and the ammonia slip parameter.

In some embodiments, the estimated amount of reductant deposits are determined, by the controller, using the following equation:

$$R_D = R_I - R_{(INOx-ONOx)} * ASP \qquad (2)$$

Where, $R_D$ is the amount of reductant deposits formed in the aftertreatment system, $R_I$ is the amount of reductant that has been inserted into the aftertreatment system, ASP is the ammonia slip parameter, and $R_{(INOx-ONOx)} * ASP$ is an amount of reductant that would be consumed to reduce the amount of $NO_x$ gases measured by the first $NO_x$ sensor to the amount of $NO_x$ gases measured by the second $NO_x$ sensor.

In some embodiments, the estimated amount of reductant deposits are determined, by the controller, based also on a catalytic conversion efficiency of the SCR unit.

In some embodiments, a method for estimating an amount of reductant deposited formed in an aftertreatment system that comprises a reductant injector and a SCR unit located downstream of the reductant injector, comprises: determining, by a controller, an average $NO_x$ amount over time of $NO_x$ gases included in an exhaust gas flowing through the aftertreatment system downstream of the SCR unit; determining, by the controller, whether the average $NO_x$ amount is equal to or greater than a threshold; in response to the average $NO_x$ amount being equal to or greater than the threshold, determining, by the controller, that ammonia slip is occurring; determining, by the controller, an ammonia slip parameter; estimating, by the controller, an amount of reductant deposits formed in the aftertreatment system based on at least an amount of $NO_x$ gases measured at a location upstream of the reductant injector, an amount of $NO_x$ gases measured at a location downstream of the SCR unit, an amount of reductant that has been inserted into the aftertreatment system by the reductant injector, and the ammonia slip parameter; and adjusting, by the controller, an amount of reductant to be inserted into the aftertreatment system based on the estimated amount of reductant deposits formed in the aftertreatment system.

In some embodiments, the estimated amount of reductant deposits are determined, by the controller, using the following equation:

$$R_D = R_I - R_{(INOx-ONOx)} * ASP$$

where, $R_D$ is the amount of reductant deposits formed in the aftertreatment system, $R_I$ is the amount of reductant that has been inserted into the aftertreatment system, ASP is the ammonia slip parameter, and $R_{(INOx-ONOx)} * ASP$ is an amount of reductant that would be consumed to reduce the amount of $NO_x$ gases measured by the first $NO_x$ sensor to the amount of $NO_x$ gases measured by the second $NO_x$ sensor.

In some embodiments, the method further comprises: in response to the average $NO_x$ amount being less than the threshold, determining, by the controller, whether a $NO_x$ amount of $NO_x$ gases in the exhaust gas downstream of the SCR unit increases to be equal to or greater than the threshold; in response to the $NO_x$ amount increasing to be equal to or greater than the threshold, determining, by the controller, if the $NO_x$ amount returns to the average $NO_x$ amount within a predetermined time; and in response to the $NO_x$ amount not returning to the average $NO_x$ amount within the predetermined time, determining, by the controller, that ammonia slip is occurring.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 1 is a schematic illustration of an aftertreatment system, according to an embodiment.

FIG. 4 is a schematic flow diagram of a method for determining presence of ammonia downstream of a SCR system included in an aftertreatment system, i.e., ammonia slip, according to an embodiment.

Figure 1:
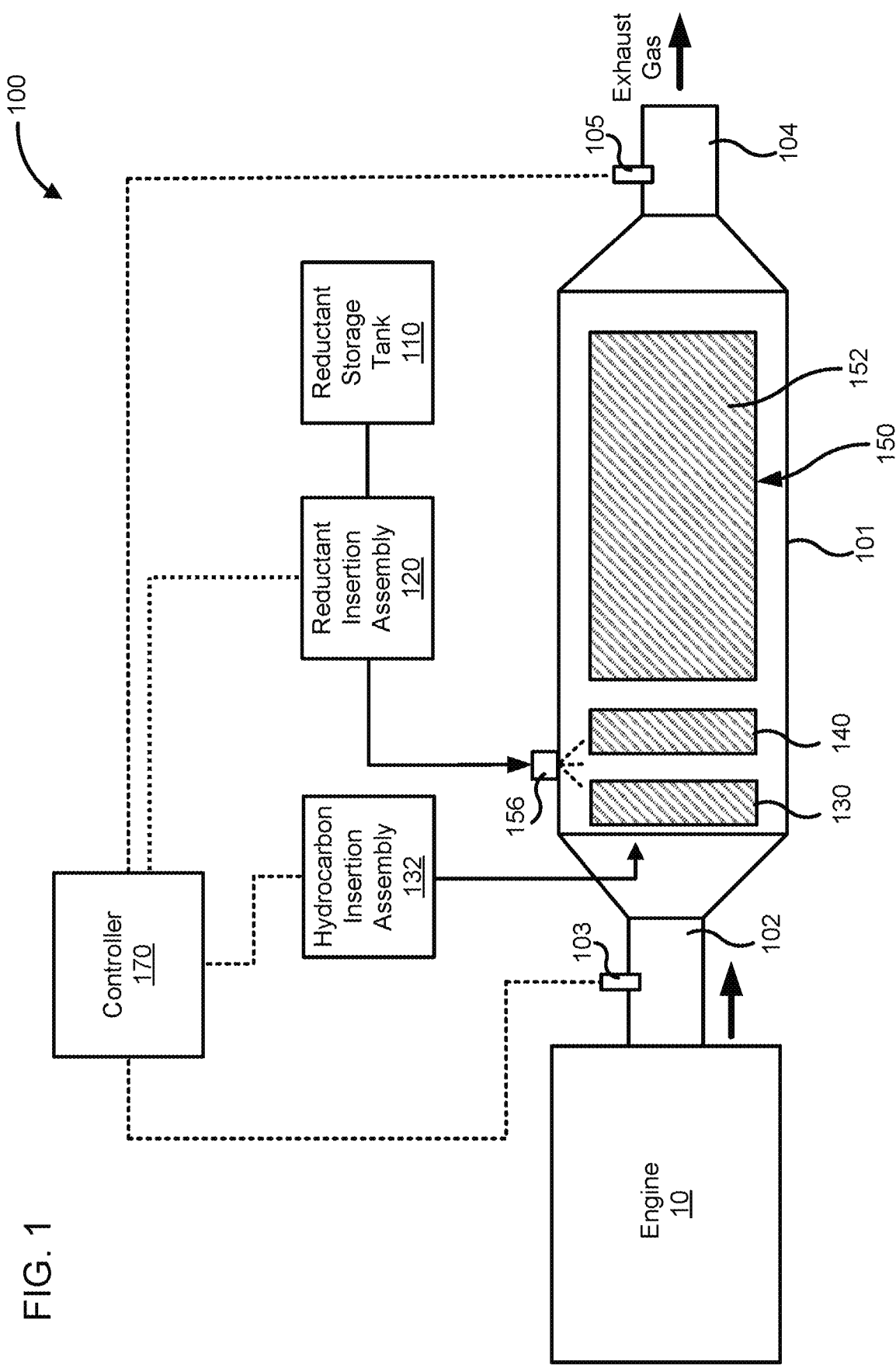

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for accurately estimating an amount of reductant deposits formed within an aftertreatment system based on an amount of $NO_x$ gases in exhaust gas entering the aftertreatment system, an amount of $NO_x$ gases in exhaust gas exiting the aftertreatment system, and an amount of reductant that has been inserted into the aftertreatment system.

SCR systems use a reductant to decompose $NO_x$ gases included in an exhaust gas (e.g., a diesel exhaust gas) flowing through the SCR system. Inaccurate dosing of the reductant, for example, inserting more reductant than is used by the SCR system for decomposing $NO_x$ gases, can result in the formation of reductant deposits in the SCR system. Similarly, at low temperatures, for example, when an engine generating the exhaust gas is turned ON after being shut OFF for some time, all the reductant may not decompose in the exhaust gas. Some of this unused reductant may crystallize and form deposits in the aftertreatment system (e.g., on inner walls, of the aftertreatment system, or one or more components included in the aftertreatment system). Initially, the reductant deposits may include soft powdery deposits, such as petal deposits, which can be removed at temperatures below 350 degrees Celsius, and are generally not detrimental to the health of the SCR system. However, over time, such reductant deposits convert into hard deposits that are only removable at high regeneration temperatures (e.g., greater than 600 degrees Celsius). Generally, high temperature regeneration events for removing reductant deposits occur at predetermined intervals, or are based on an amount of reductant deposits determined using amount of fuel inserted, engine speed, or other engine parameters. Such conventional means for preplanned regeneration or causing regeneration based on conventional methods used to determine amount of reductant deposits leads to a higher number of regenerations events than is necessary. Frequent occurrence of such high temperature regeneration events ages the SCR catalyst included in the SCR system, and reduces the life of the SCR catalyst.

In contrast, various embodiments of the systems and methods described herein for estimating the amount of reductant deposits may provide one or more benefits, including, for example: (1) allowing accurate estimation of reductant deposits; (2) inhibiting formation of hard reductant deposits in the aftertreatment system; and (3) reducing a number of high temperature regeneration events, thereby increasing a life of the SCR unit.

FIG. 1 is a schematic illustration of an aftertreatment system 100 according to an embodiment. The aftertreatment system 100 is configured to receive exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas, such as, for example, $NO_x$ gases, CO, hydrocarbons, etc. The aftertreatment system 100 may comprise a reductant storage tank 110, a reductant insertion assembly 120, a housing 101, a SCR unit 150 comprising a SCR catalyst 152, and a controller 170. In some embodiments, the aftertreatment system 100 may also include an oxidation catalyst 130, a mixer 140, and a hydrocarbon insertion assembly 132.

The housing 101 defines an internal volume within which the SCR unit 150 is disposed. The housing 101 may be formed from a rigid, heat-resistant and corrosion-resistant material, for example, stainless steel, iron, aluminum, metals, ceramics, or any other suitable material. The housing 101 may have any suitable cross-section, for example circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to reduce constituents of the exhaust gas such as $NO_x$ gases, unburnt hydrocarbons, etc. included in the exhaust gas).

A first $NO_x$ sensor 103 may be positioned in the inlet conduit 102 and is configured to measure an amount of $NO_x$ gases included in the exhaust gas at a location upstream of reductant injector 156 and flowing into the SCR unit 150. The first $NO_x$ sensor 103 may include a physical sensor or a virtual sensor (e.g., an inlet $NO_x$ amount of exhaust gas entering the aftertreatment system 100 determined virtually by the controller 170 based on various engine parameters such as engine speed, engine torque, amount of fuel inserted, etc.). In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second $NO_x$ sensor 105 is positioned in the outlet conduit 104 and is configured to determine an amount of $NO_x$ gases in the exhaust gas at a location downstream of the SCR unit 150 (e.g., in the exhaust gas being expelled from the aftertreatment system 100 after passing through the SCR unit 150). In some embodiments, a particulate matter sensor may also be disposed in the outlet conduit 104 and configured to determine an amount of particulate matter (e.g., soot included in the exhaust gas exiting the filter) in the exhaust gas exiting the aftertreatment system 100. In still other embodiments, an ammonia sensor may also be disposed in the outlet conduit 104 and configured to measure an amount of ammonia in the exhaust gas exiting the aftertreatment system 100, i.e., determine the ammonia slip. This may be used as a measure of determining a catalytic conversion efficiency of the SCR catalyst 152 included in the SCR unit 150, adjust an amount of reductant to be inserted into the SCR unit 150, and/or adjust a temperature of the SCR unit 150 so as to allow the SCR unit 150 to effectively use the ammonia for catalytic decomposition of the $NO_x$ gases included in the exhaust gas flowing therethrough. An ammonia oxidation ($AMO_x$) catalyst (not shown) may be positioned downstream of the SCR unit 150 so as to decompose any unreacted ammonia in the exhaust gas downstream of the SCR unit 150.

An oxidation catalyst 130 (e.g., a diesel oxidation catalyst) may be positioned upstream of the SCR unit 150 and configured to decompose unburnt hydrocarbons and/or CO included in the exhaust gas. In particular embodiments, the oxidation catalyst 130 comprises a diesel oxidation catalyst. In some embodiments, a mixer 140 may also be disposed upstream of the SCR unit 150, for example, between the oxidation catalyst 130 and the SCR unit 150. The mixer 140 is configured to facilitate mixing of the reductant inserted into the aftertreatment system 100 with the exhaust gas so as to facilitate decomposition of the reductant in the exhaust gas and generate ammonia.

In various embodiments, the aftertreatment system 100 may also include a filter (not shown), for example, disposed between the oxidation catalyst 130 and the SCR unit 150, and configured to remove particulate matter (e.g., soot, debris, inorganic particles, etc.) from the exhaust gas. In various embodiments, the filter may include a ceramic filter. In some embodiments, the filter may include a cordierite filter, which can, for example, be an asymmetric filter. In yet other embodiments, the filter may be catalyzed. Furthermore, a hydrocarbon insertion assembly 132 may be coupled to the housing 101 and configured to selectively insert hydrocarbons onto the oxidation catalyst 130. The oxidation catalyst 130 is formulated to catalyze ignition of the hydrocarbons so as to increase a temperature of the exhaust gas, for example, to regenerate the SCR unit 150 and/or a filter disposed downstream of the oxidation catalyst 130.

The SCR unit 150 includes a SCR catalyst 152 formulated to decompose $NO_x$ gases included in the exhaust gas flowing therethrough in the presence of a reductant. In some embodiments, the SCR unit 150 may include a selective catalytic reduction filter (SCRF). The SCR catalyst 152 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 152. Such washcoat materials may comprise, for example, aluminum oxide, titanium dioxide, silicon dioxide, any other suitable washcoat material, or a combination thereof. The monolith core may be securely positioned in a can to form the SCR unit 150 that is installed in the aftertreatment system 100.

Although FIG. 1, shows only the oxidation catalyst 130 and the SCR unit 150 positioned within the internal volume defined by the housing 101, in other embodiments, a plurality of aftertreatment components may be positioned within the internal volume defined by the housing 101 in addition to the oxidation catalyst 130 and the SCR unit 150. Such aftertreatment components may comprise, for example, the mixer 140, baffle plates, secondary filters (e.g., a secondary partial flow or catalyzed filter) or any other suitable aftertreatment component.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by mass of urea and 67.5% by mass of deionized water, including 40% by mass of urea and 60% by mass of deionized water, or any other suitable ratio of urea to deionized water.

A reductant insertion assembly 120 is fluidly coupled to the reductant storage tank 110. The reductant insertion assembly 120 is configured to selectively insert the reductant into the SCR unit 150 or upstream thereof (e.g., into the inlet conduit 102) or a mixer (not shown) positioned upstream of the SCR unit 150. The reductant insertion assembly 120 may comprise various structures to facilitate receipt of the reductant from the reductant storage tank 110 and delivery to the SCR unit 150, for example, pumps, valves, screens, filters, etc.

The aftertreatment system 100 also comprises a reductant injector 156 fluidly coupled to the reductant insertion assembly 120 and configured to insert the reductant (e.g., a combined flow of reductant and compressed air) into the SCR unit 150. In various embodiments, the reductant injector 156 may comprise a nozzle having predetermined diameter. In various embodiments, the reductant injector 156 may be positioned in a reductant port positioned at a sidewall of the housing 101 and structured to allow insertion of a reductant therethrough into the internal volume defined by the housing 101. The reductant injector 156 may be structured to deliver a stream or a jet of the reductant into the internal volume of the housing 101 so as to deliver the reductant to the SCR unit 150. The reductant port may be positioned upstream of the SCR unit 150 (e.g., to allow reductant to be inserted into the exhaust gas upstream of the SCR unit 150) or over the SCR unit 150 (e.g., to allow reductant to be inserted directly on the SCR unit 150). In other embodiments, the reductant port may be disposed on the inlet conduit 102 and configured to allow insertion of the reductant into the inlet conduit 102 upstream of the SCR unit 150, or between the oxidation catalyst 130 and the mixer 140. In such embodiments, mixers, baffles, vanes or other structures may be positioned in the inlet conduit 102 so as to facilitate mixing of the reductant with the exhaust gas.

Referring again to FIG. 1, the controller 170 is communicatively coupled to the first $NO_x$ sensor 103 and may be configured to receive a first $NO_x$ sensor signal from the first $NO_x$ sensor 103 corresponding to a first amount of $NO_x$ gases in the exhaust gas at a location upstream of the reductant injector 156. The controller 170 is also communicatively coupled to the second $NO_x$ sensor 105 and configured to receive a second $NO_x$ sensor signal from the second $NO_x$ sensor 105 and determine a second amount of $NO_x$ gases or ammonia included in the exhaust gas downstream of the SCR unit 150.

The controller 170 is also coupled to the reductant insertion assembly 120 and configured to determine an amount of reductant inserted into the aftertreatment system 100 via the reductant insertion assembly 120. For example, the controller 170 may be operatively coupled to the reductant insertion assembly 120 and configured to instruct the reductant insertion assembly 120 to insert an amount of reductant inserted into the aftertreatment system 100 based on one or more engine parameters, the amount of $NO_x$ gases upstream of the reductant injector and downstream of the SCR unit 150, a temperature of the exhaust gas, or any other suitable parameters. The controller 170 may be operably coupled to the various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 is configured to estimate an amount of reductant deposits that have formed in the aftertreatment system 100 (e.g., deposited on inner surfaces of the aftertreatment system, on the mixer, or other components of the aftertreatment system 100) based on the amount of reductant that has been inserted into the aftertreatment system 100, and the amount of $NO_x$ gases upstream of the reductant injector 156, and downstream of the SCR unit 150. In some embodiments, the controller 170 is programmed to estimate an amount of reductant deposits formed in the aftertreatment system 100 based on at least the amount of $NO_x$ gases measured at the location upstream of the reductant injector 156, the amount of $NO_x$ gases measured at the location downstream of the SCR unit 150, and an amount of reductant that has been inserted into the aftertreatment system 100 by the reductant injector 156. For example, the controller 170 may be configured to estimate the amount of reductant deposits formed in the aftertreatment system 100 via the following equation:

$$R_D = R_I - R_{(INOx-ONOx)} \quad (1)$$

where, $R_D$=amount of reductant deposits formed in the aftertreatment system 100, $R_I$=amount of reductant inserted into the aftertreatment system 100, and $R_{(INOx-ONOx)}$ is the amount of reductant that would be consumed to reduce the $NO_x$ amount from the amount of $NO_x$ gases upstream of the reductant injector 156 to the amount of $NO_x$ gases downstream of the SCR unit 150.

Equation (1) is essentially a mass balance equation that determines or estimates how much reductant remains unconsumed in the aftertreatment system 100, which has the potential to form reductant deposits in the aftertreatment system 100. The controller 170 may include a free running counter that determines (e.g., accumulates, sums, or integrates) the amount of reductant deposited in real time to so as to estimate the total amount of reductant deposits formed in the aftertreatment system 100 at any given time. The counter increments at a faster rate if there is a greater difference between the amount of reductant inserted into the aftertreatment system 100, and the amount of reductant that would be consumed to reduce the $NO_x$ amount from the amount of $NO_x$ gases upstream of the reductant injector 156 to the amount of $NO_x$ gases downstream of the SCR unit 150.

The controller 170 is also programmed to instruct or command the reductant insertion assembly 120 to adjust an amount of reductant to be inserted into the aftertreatment system 100 by the reductant injector 156 based on the estimated amount of reductant deposits formed in the aftertreatment system 100. For example, if the reductant deposits are being deposited at a faster deposition rate than a deposition rate threshold, the controller 170 may instruct the reductant insertion assembly 120 to reduce an amount of reductant inserted into the aftertreatment system 100, so as to reduce the reductant deposition rate.

In some embodiments, in response to the amount of reductant deposits formed in the aftertreatment system being equal to or greater than a threshold amount, the controller 170 is programmed to instruct or command the hydrocarbon insertion assembly 132 to insert hydrocarbons into the aftertreatment system 100. The inserted hydrocarbons combust in the exhaust gas (e.g., in an oxidation reaction catalyzed by the oxidation catalyst 130) so as to increase the temperature of the exhaust gas to a regeneration temperature (e.g., greater than 600 degrees Celsius) sufficient to decompose the reductant deposits formed in the aftertreatment system 100.

The reductant inserted into the exhaust gas flowing through the aftertreatment system 100 decomposes to generate exhaust gas, which is then used by the SCR unit 150 to catalyze decomposition of $NO_x$ gases included in the exhaust gas. In some situations, a portion of the ammonia gas remains unconsumed as it flows through the aftertreatment system 100 and remains present in the exhaust gas downstream of the SCR unit 150. This is commonly known as ammonia slip, that is the ammonia that slips through the SCR unit 150 without being consumed. The ammonia slip represents a portion of the reductant that is not used for $NO_x$ decomposition, but is also not deposited in the aftertreatment system 100, i.e., does not cause reductant deposits. The controller 170 is configured to account for the ammonia slip when estimating the amount of reductant deposited in the aftertreatment system 100, as described herein.

The second $NO_x$ sensor 105 used for determining amount or concentration of $NO_x$ gases in the exhaust gas downstream of the SCR unit 150 is also sensitive to ammonia. Thus, a portion of the second $NO_x$ amount signal being measured by the second $NO_x$ sensor 105 corresponds to the amount of ammonia in the exhaust gas downstream of the SCR unit 150. The controller 170 uses this cross-sensitivity to ammonia to determine whether ammonia is present in the exhaust gas downstream of the SCR unit 150, i.e., ammonia slip is occurring. The controller 170 may be programmed to determine the portion of the second $NO_x$ amount signal attributable to the ammonia slip and determine an ammonia slip parameter therefrom. For example, the controller 170 may determine a percentage of the second $NO_x$ amount signal attributable to the ammonia slip, which in some instances may be as high as 70%-80% of the total second $NO_x$ amount signal. The controller 170 is configured to determine the ammonia slip parameter from the portion or percentage of the second $NO_x$ amount signal attributed to the ammonia.

The controller 170 is programmed to estimate the amount of reductant deposits formed in the aftertreatment system 100 based on at least the amount of $NO_x$ gases measured at the location upstream of the reductant injector 156, the amount of $NO_x$ gases measured at the location downstream of the SCR unit 150, the amount of reductant that has been inserted into the aftertreatment system 100 by the reductant injector 156, and the ammonia slip parameter. For example, the controller 170 may be configured to use the ammonia slip parameter as a weighting parameter in equation 1 so as to reduce an increment rate and decrement of the reductant deposit counter as follows:

$$R_D = R_I - R_{(INOx-ONOx)} * ASP \qquad (2)$$

where ASP is the ammonia slip parameter. The ammonia slip parameter may be a number greater than 1, which increases the value of the term within the bracket in equation (2). For example, if the ammonia portion of the second $NO_x$ signal is 70%, the ammonia sip parameter may be 0.7. Since $R_I$ is unaffected by the ammonia slip parameter, the $R_D$ determined in equation 2 is reduced because of the higher value of the term within the bracket relative to equation (1), thereby accounting for ammonia slip.

Alternatively, there may be separate ammonia slip parameters for the upstream and downstream $NO_x$ gases, so that the controller 170 is configured to use two ammonia slip parameters as weighting parameters so as to reduce an increment rate and decrement of the reductant deposit counter as follows:

$$R_D = R_I - (R_{(INOx)} * ASP_I) - (R_{(ONOx)} * ASP_O) \qquad (3)$$

In some embodiments, the controller 170 may be programmed to determine that ammonia is present in the exhaust gas downstream of the SCR unit 150 based on the second $NO_x$ amount being measured by the second $NO_x$ sensor 105. For example, in response to an average second $NO_x$ amount over time of $NO_x$ gases in the exhaust gas determined by the second $NO_x$ sensor being equal to or greater than a threshold, the controller 170 determines that ammonia is present downstream of the SCR unit 150, i.e., ammonia slip is occurring. The controller 170 may then determine the ammonia slip parameter and use equation (2) to estimate the amount of reductant deposits formed in the aftertreatment system 100.

In some instances, spikes in amount of $NO_x$ gases in the exhaust gas downstream of the SCR unit 150 may cause sudden increase or spikes in the second $NO_x$ amount measured by the second $NO_x$ sensor 105, which may be greater than the threshold, but is not attributable to ammonia slip. The controller 170 may also be programmed to determine whether the second $NO_x$ amount is equal to or greater than the threshold. In response to the second $NO_x$ amount returning to the average second $NO_x$ amount within a predetermined time period, the controller 170 determines that the spike in the second $NO_x$ amount is due to an actual $NO_x$ spike. When however, the second $NO_x$ amount spike does not return to the average second $NO_x$ amount within the predetermined time period, this implies that the increase is due to ammonia slip, and the controller 170 uses equation 2 to estimate an amount of reductant deposits.

In some embodiments, the controller 170 may also be programmed to determine a catalytic conversion efficiency of the SCR unit 150, and estimate amount of reductant deposits formed in the aftertreatment system 100 based also on the catalytic conversion efficiency of the SCR unit 150. For example, if the catalytic conversion efficiency of the SCR unit 150 is very high (e.g., greater than 97%), which may be due to the SCR catalyst 152 temperature being high (e.g., greater than 400 degrees Celsius), the SCR unit 150 is capable of consuming all the inserted reductant as well as deplete reductant deposits in the aftertreatment system 100. At such high catalytic conversion efficiency, substantially all (e.g., greater than 97%) of the ammonia or ammonium oxide in the exhaust gas is converted to nitrogen ($N_2$) after passing through the SCR unit, and does not contribute to the second $NO_x$ amount. The controller 170 may be programmed to estimate the amount of reductant deposits that are consumed due to the high temperature of the exhaust gas, and deduct the amount from equation (1) or (2).

In some instances, the reductant may impinge on the mixer 140 and result in soft reductant deposits, for example, petal shaped deposits that are easily decomposed in the exhaust gas at temperatures in the range of 300-400 degrees Celsius. Therefore, such deposits will either not contribute to the $R_D$ in equation (1) as they will eventually be consumed in the SCR unit 150, or contribute to the deposit if it results in ammonia slip, which will be accounted for in equation (2). In such instances, the deposit being decomposed in the aftertreatment system 100 also provides ammonia to the exhaust gas in addition to the reductant being inserted into the aftertreatment system 100. The controller 170 may also be programmed to reduce the amount of reductant inserted into the aftertreatment system 100 to account for the reductant deposits being consumed. In this manner, less reductant is used, as well as the total amount of reductant deposits is accurately calculated, thereby reducing occurrence of frequent high temperature regeneration events. On the other hand, if the amount of reductant inserted into aftertreatment system 100 is reduced too much, the second $NO_x$ amount may increase beyond an allowable second $NO_x$ amount that can be present in the exhaust gas expelled into the environment. The controller 170 may be programmed to reduce the amount of reductant inserted into aftertreatment system 100 to account for reductant deposits that are being consumed, and increase the amount of reductant inserted in response to the second $NO_x$ amount being equal to or greater than the allowable second $NO_x$ amount.

Figure 2:
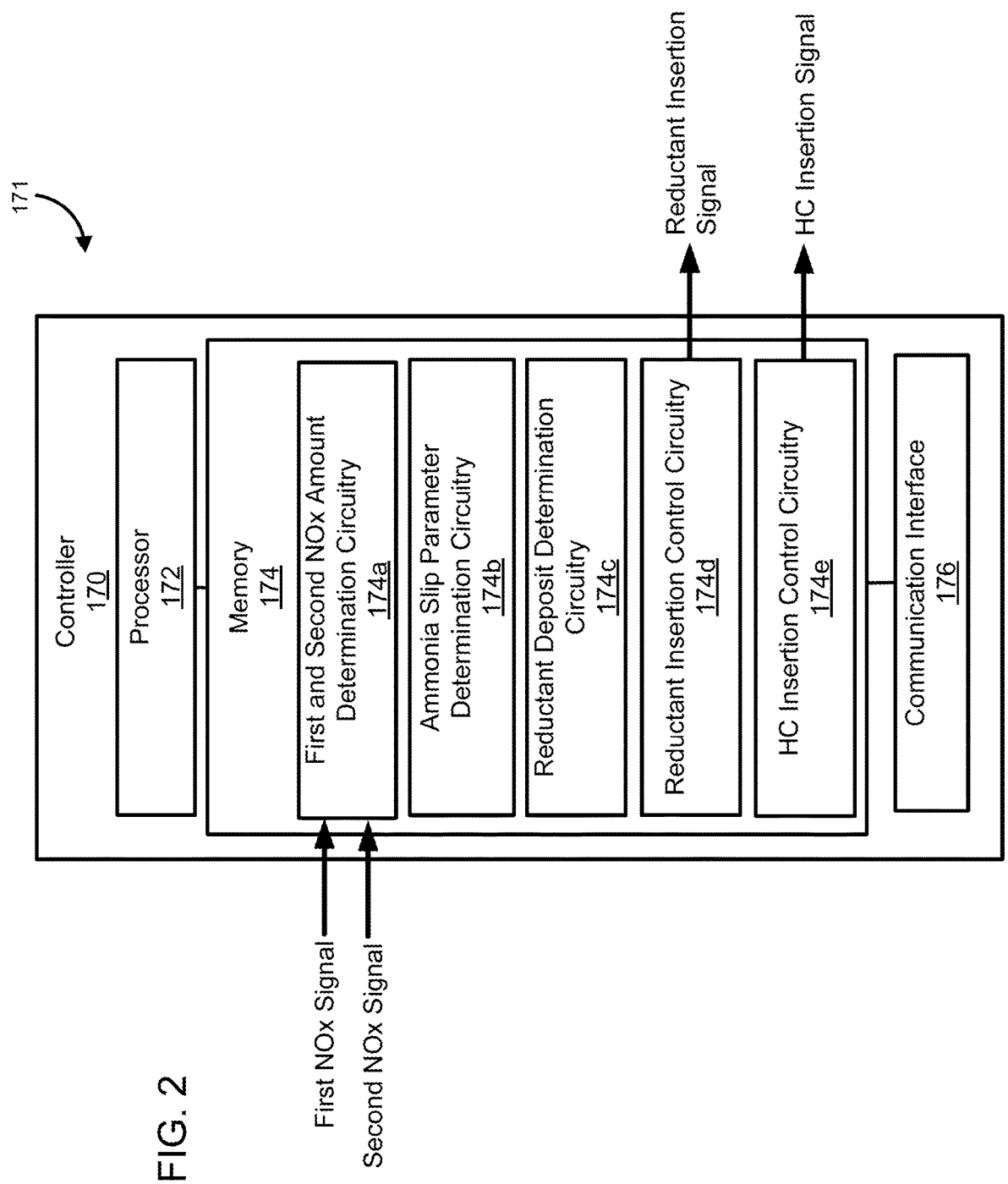
FIG. 2 is a schematic block diagram of a control system that may include a controller used in the aftertreatment system of FIG. 1, according to an embodiment.

In particular embodiments, the controller 170 may be included in a control system. For example, FIG. 2 is a schematic block diagram of a control system 171 that includes the controller 170, according to an embodiment. The controller 170 comprises a processor 172, a memory 174, or any other computer readable medium, and a communication interface 176. Furthermore, the controller 170 includes a first and second $NO_x$ amount determination circuitry 174a, an ammonia slip parameter determination circuitry 174b, a reductant deposit estimation circuitry 174c, a reductant insertion control circuitry 174d, and a hydrocarbon (HC) insertion control circuitry 174e. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e are embodied as hardware units, such as electronic control units. As such, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e may be embodied as one or more circuitry components including, but not limited to, processing circuitry, network interfaces, peripheral devices, input devices, output devices, sensors, etc.

In some embodiments, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e may also include programmable hardware devices such as field programmable gate arrays, programmable array logic, programmable logic devices or the like. In this regard, the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e may include one or more memory devices for storing instructions that are executable by the processor(s) of the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e. Thus, the depicted configuration represents the aforementioned arrangement the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e are embodied as machine or computer-readable media. However, as mentioned above, this illustration is not meant to be limiting as the present disclosure contemplates other embodiments such as the aforementioned embodiment where the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e, or at least one circuit of the first and second $NO_x$ amount estimation circuitry 174a, the ammonia slip parameter determination circuitry 174b, the reductant deposit estimation circuitry 174c, the reductant insertion control circuitry 174d, and the HC insertion control circuitry 174e are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the first and second $NO_x$ amount determination circuitry 174a, the ammonia slip parameter determination circuitry 174b, the reductant deposit estimation circuitry 174c, the reductant insertion control circuitry 174d, and the HC insertion control circuitry 174e) may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first $NO_x$ sensor 103, the second $NO_x$ sensor 105, the reductant insertion assembly 120, or the hydrocarbon insertion assembly 132. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The first and second $NO_x$ amount determination circuitry 174a is configured to receive a first $NO_x$ signal from the first $NO_x$ sensor 103 and determine a first amount of $NO_x$ gases at a location upstream of a reductant injector 156 included in the aftertreatment system 100 therefrom (e.g., an inlet $NO_x$ amount of $NO_x$ gases entering the aftertreatment system 100). Furthermore, the first and second $NO_x$ amount determination circuitry 174a is configured to receive a second $NO_x$ signal from the second $NO_x$ sensor 105 and determine a second amount of $NO_x$ gases at a location downstream of the SCR unit 150 therefrom (e.g., an outlet $NO_x$ amount). The first and second $NO_x$ amount determination circuitry 174a may also be configured to determine if ammonia slip is occurring. For example, the first and second $NO_x$ amount determination circuitry 174a may determine that ammonia slip is occurring when an average second $NO_x$ amount over time of $NO_x$ gases downstream of the SCR unit 150 is above a threshold, and/or when a spike in the second $NO_x$ signal does not decrease to the average second $NO_x$ amount within a predetermined time, as previously described herein. The first and second $NO_x$ amount determination circuitry 174a may then be configured to determine the portion or percentage of the second $NO_x$ amount signal that is attributed to ammonia gas present in the exhaust gas downstream of the SCR unit 150.

The ammonia slip parameter determination circuitry 174b is configured to determine the ammonia slip parameter. For example, in response to the first and second $NO_x$ amount determination circuitry 174a determining that ammonia slip is occurring, the ammonia slip parameter determination circuitry 174b may then be configured to determine the portion or percentage of the second $NO_x$ amount signal that is attributed to ammonia gas present in the exhaust gas downstream of the SCR unit 150 and determine the ammonia slip parameter therefrom.

The reductant deposit estimation circuitry 174c is configured to determine an amount of reductant deposited in the aftertreatment system 100. For example, the reductant deposit estimation circuitry 174c may use equation (1) or equation (2) to estimate the amount of reductant deposits formed as previously described herein.

The reductant insertion control circuitry 174d is configured to determine an amount of reductant that has been inserted into the aftertreatment system 100, which is used by the reductant deposit estimation circuitry 174c to estimate the amount of reductant deposits. The reductant insertion control circuitry 174d is also configured to adjust the amount of reductant to be inserted into the aftertreatment system 100 based on one or more engine parameters, $NO_x$ gases entering the aftertreatment system, as well as the estimated amount of reductant deposits formed in the aftertreatment system 100.

The HC insertion control circuitry 174e is configured to control insertion of hydrocarbons into the aftertreatment system 100. For example, in response to an amount of reductant deposited in the aftertreatment system 100 as determined by the reductant deposit estimation circuitry 174c being equal to or greater than a reductant deposit threshold, the HC insertion control circuitry 174e may instruct the hydrocarbon insertion assembly 132 to insert hydrocarbons into the exhaust gas flowing through the aftertreatment system 100. The hydrocarbons combust in the oxidation catalyst 130 causing an increase in temperature of the exhaust gas sufficient to decompose the reductant deposits.

Figure 3:
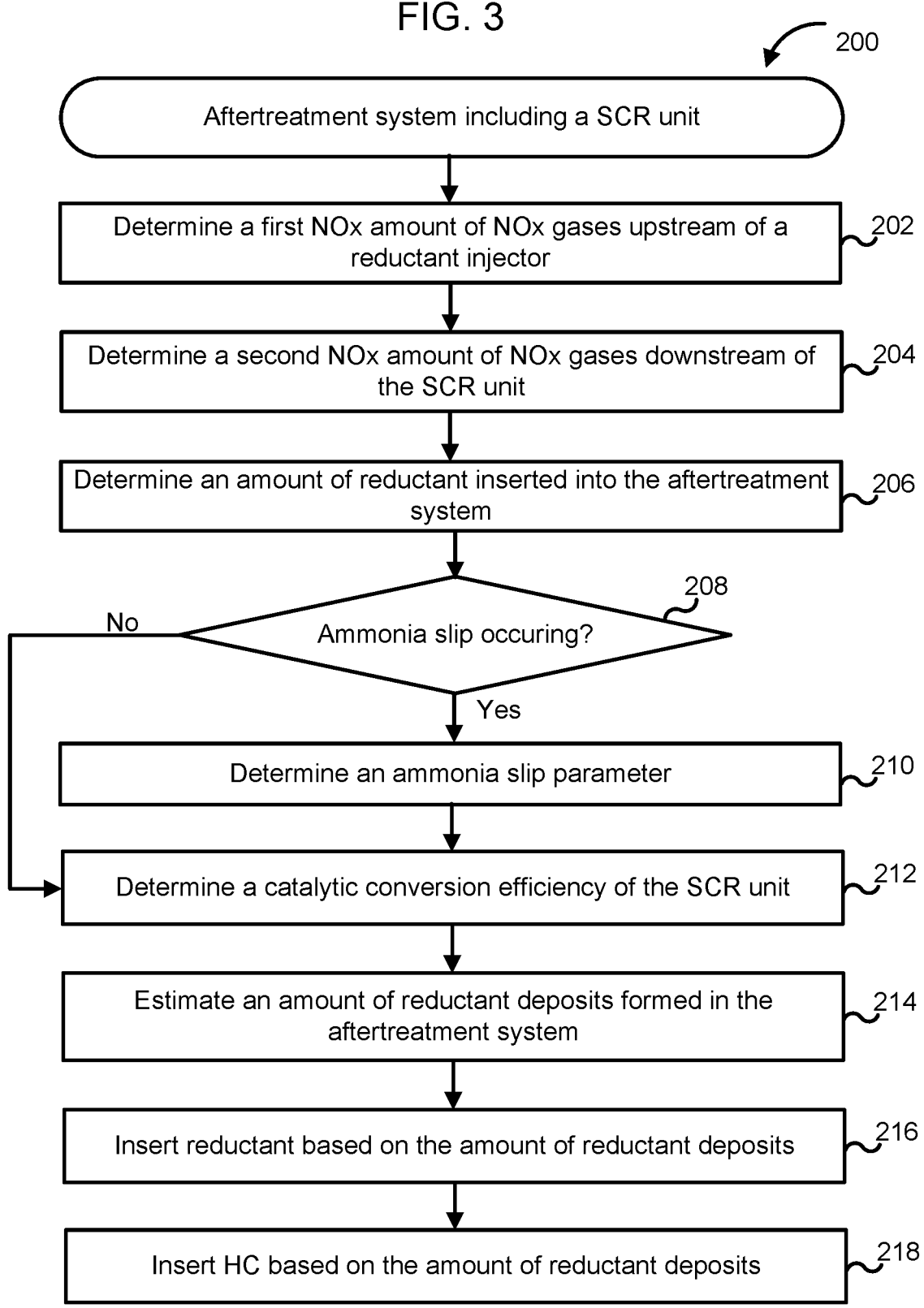
FIG. 3 is a schematic flow diagram of a method for estimating an amount of reductant deposits formed in an aftertreatment system, according to an embodiment.

FIG. 3 is a schematic flow diagram of a method 200 for estimating amount of reductant deposits formed in an aftertreatment system (e.g., the aftertreatment system 100) that includes an SCR unit (e.g., the SCR unit 150), according to an embodiment. While the method 200 is described with respect to the controller 170, it should be understood that the operations of the method 200 or any other method described herein (e.g., the method 300) may be performed with any other controller or control system (e.g., an engine control system).

The method 200 includes determining a first $NO_x$ amount of $NO_x$ gases at a location upstream of a reductant injector (e.g., the reductant injector 156) that is included in the aftertreatment system, at 202. For example, the controller 170 may be configured to receive a first $NO_x$ amount signal from the first $NO_x$ sensor 103 and determine the first $NO_x$ amount therefrom. At 204, a second $NO_x$ amount of $NO_x$ gases at a location downstream of the SCR unit (e.g., an outlet $NO_x$ amount) is determined. For example, the controller 170 may be configured to receive a second $NO_x$ amount signal from the second $NO_x$ sensor 105 and determine the second $NO_x$ amount therefrom. At 206, an amount of reductant that has been inserted into the aftertreatment system is determined. For example, the controller 170 may be operatively coupled to the reductant insertion assembly 120 and receive a reductant insertion signal from the reductant insertion assembly 120 to determine the amount of reductant that has been inserted into the aftertreatment system 100.

In some embodiments, the method 200 also includes determining if ammonia slip is occurring, at 208. In response to ammonia slip not occurring (208: NO), a catalytic conversion efficiency of the SCR unit (e.g., the SCR unit 150) may be determined (e.g., by the controller 170), at 212. In response to determining that ammonia slip is occurring (208: YES), i.e., ammonia is present downstream of the SCR unit 150, an ammonia slip parameter is determined, at 210 as previously described herein before proceeding to operation 212.

At 214, the method 200 includes estimating an amount of reductant deposits formed in the aftertreatment system 100 based on the amount of reductant that has been inserted into the aftertreatment system 100, the first $NO_x$ amount, and the second $NO_x$ amount, for example using equation 1. For example, the controller 170 may estimate the amount of reductant deposits formed in the aftertreatment system via equation 1.

In some embodiments, amount of reductant deposits formed may be estimated (e.g., by the controller 170) based on the first $NO_x$ amount, the second $NO_x$ amount, the amount of reductant inserted into the aftertreatment system, and the ammonia slip parameter, for example, using equation (2) as previously described herein. In some embodiments, the amount of reductant deposits formed may also be determined (e.g., by the controller 170) based also on the catalytic conversion efficiency of the SCR unit 150, as previously described herein.

At 216, an amount of reductant inserted into the aftertreatment system is adjusted based on the amount of reductant deposits formed in the aftertreatment system 100 (e.g., by the reductant insertion assembly 120 based on instructions received from the controller 170). In some embodiments, at 218, hydrocarbons may be inserted into the aftertreatment system (e.g., by the HC insertion assembly 132 based on instructions received from the controller 170). For example, in response to determining that an amount of reductant deposits formed in the aftertreatment system 100 is equal to or greater than a reductant deposit threshold, the controller 170 may instruct the HC insertion assembly 132 to insert hydrocarbons into the aftertreatment system 100. The hydrocarbons combust across the oxidation catalyst 130 and increase the temperature of the exhaust gas to a temperature (e.g., greater than 600 degrees Celsius) which is sufficient to decompose reductants deposits formed in the aftertreatment system 100.

FIG. 4 is a schematic flow diagram of a method 300 for determining that ammonia slip is occurring in an aftertreatment system (e.g., the aftertreatment system 100), according to an embodiment. The method 300 may be used by the controller 170 to determine whether ammonia slip is occurring, and in response to ammonia slip occurring, determining the ammonia slip parameter at operation 210 of the method 200.

The method 300 includes determining an average second $NO_x$ amount over time of $NO_x$ gases included in the exhaust gas downstream of an SCR unit (e.g., the SCR unit 150) determined over time, at 302. At 304, it is determined if the average second $NO_x$ amount is greater than a threshold. In response to the average second $NO_x$ amount being equal to or greater than the threshold (304: YES), it is determined that ammonia slip is occurring, at 306, and the controller 170 may determine the ammonia slip parameter.

In response to the average second $NO_x$ amount being less than the threshold (304: NO), the method 300 may proceed to operation 308, and it is determined whether the second $NO_x$ amount increases to be equal to or greater than the threshold (e.g., by the second $NO_x$ sensor 105), at 308. For example, if a spike in the second $NO_x$ amount above the threshold is observed. If such a spike in the second $NO_x$ amount is not observed (308: NO), the method 300 returns to operation 302.

If an increase in the second $NO_x$ amount above the threshold is observed (308: YES), the controller 170 may determine if the second $NO_x$ amount returns to the average second $NO_x$ amount within a predetermined time, at 310. In response to determining that the second $NO_x$ amount measured by the second $NO_x$ sensor returns to the average second $NO_x$ amount within the predetermined time, the controller 170 determines that ammonia slip is not occurring (310: YES), and the method 300 returns to operation 302. If the second $NO_x$ amount does not return to the average second $NO_x$ amount within the predetermined time period (310: NO), the controller 170 determines that ammonia slip is occurring, at 312, and the controller 170 may determine the ammonia slip parameter.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
a selective catalytic reduction (SCR) unit;
a reductant injector configured to insert reductant into the aftertreatment system;
a first $NO_x$ sensor configured to measure an amount of $NO_x$ gases at a location upstream of the reductant injector;
a second $NO_x$ sensor configured to measure an amount of $NO_x$ gases at a location downstream of the SCR unit; and
a controller programmed to:
estimate an amount of reductant deposits formed in the aftertreatment system based on at least the amount of $NO_x$ gases measured at the location upstream of the reductant injector, the amount of $NO_x$ gases measured at the location downstream of the SCR unit, and an amount of reductant that has been inserted into the aftertreatment system by the reductant injector, and adjust an amount of reductant to be inserted into the aftertreatment system based on the estimated amount of reductant deposits formed in the aftertreatment system.

2. The aftertreatment system of claim 1, wherein the controller is further programmed to, in response to the amount of reductant deposits formed in the aftertreatment system being equal to or greater than a threshold amount, cause a hydrocarbon insertion assembly to insert hydrocarbons into the aftertreatment system to increase a temperature of the aftertreatment system to a regeneration temperature for removing the reductant deposits.

3. The aftertreatment system of claim 1, wherein the controller is configured to estimate the amount of reductant deposits using the following equation:

$$R_D = R_I - R_{(INOx-ONOx)}$$

where:
$R_D$ is the amount of reductant deposits formed in the aftertreatment system,
$R_I$ is the amount of reductant that has been inserted into the aftertreatment system, and
$R_{(INOx-ONOx)}$ is an amount of reductant that would be consumed to reduce the amount of $NO_x$ gases measured by the first $NO_x$ sensor to the amount of $NO_x$ gases measured by the second $NO_x$ sensor.

4. The aftertreatment system of claim 3, wherein the controller is configured to estimate the amount of reductant deposits formed in the aftertreatment system at any given time using a free running counter that accumulates, sums, or integrates individual estimates of reductant deposits formed in the aftertreatment system over a period of time.

5. The aftertreatment system of claim 1, wherein the controller is programmed to:
determine an ammonia slip parameter; and
estimate the amount of reductant deposits formed in the aftertreatment system based on at least the amount of $NO_x$ gases measured at the location upstream of the reductant injector, the amount of $NO_x$ gases measured at the location downstream of the SCR unit, the amount of reductant that has been inserted into the aftertreatment system by the reductant injector, and the ammonia slip parameter.

6. The aftertreatment system of claim 5, wherein the controller is configured to determine the ammonia slip parameter based on the amount of $NO_x$ gases measured by the second $NO_x$ sensor.

7. The aftertreatment system of claim 5, wherein the controller is configured to estimate the amount of reductant deposits using the following equation:

$$R_D = R_I - R_{(INOx-ONOx)} * ASP$$

where,
$R_D$ is the amount of reductant deposits formed in the aftertreatment system,
$R_I$ is the amount of reductant that has been inserted into the aftertreatment system,
ASP is the ammonia slip parameter, and
$R_{(INOx-ONOx)} * ASP$ is an amount of reductant that would be consumed to reduce the amount of $NO_x$ gases measured by the first $NO_x$ sensor to the amount of $NO_x$ gases measured by the second $NO_x$ sensor.

8. The aftertreatment system of claim 1, wherein the controller is configured to:
determine a temperature of an exhaust gas that includes $NO_x$ gases flowing through the aftertreatment system;
estimate an amount of reductant deposits consumed based on the temperature of the exhaust gas;
deduct the amount of reductant deposits consumed from the estimated amount of reductant deposits formed in the aftertreatment system to determine an adjusted amount of reductant deposits formed; and
adjust an amount of reductant to be inserted into the aftertreatment system based on the adjusted amount of reductant deposits.

9. The aftertreatment system of claim 1, wherein the controller is configured to:
in response to the determining that the estimated amount of reductant deposits is being formed at a faster deposition rate than a deposition rate threshold, instruct the reductant injector to reduce an amount of reductant inserted into the aftertreatment system.

10. The aftertreatment system of claim 5, wherein the controller is configured to:
determine an average second $NO_x$ amount over time of $NO_x$ gases in an exhaust gas downstream of the SCR unit; and
determine the ammonia slip parameter in response to the average second $NO_x$ amount being equal to or greater than a threshold.

11. The aftertreatment system of claim 1, wherein the controller is configured to estimate the amount of reductant deposits formed based also on a catalytic conversion efficiency of the SCR unit.

12. A method for estimating an amount of reductant deposits formed in an aftertreatment system comprising a reductant injector and a SCR unit located downstream of the reductant injector, the method comprising:
receiving, by a controller, a first $NO_x$ amount signal from a first $NO_x$ sensor indicative of an amount of $NO_x$ gases at a location upstream of the reductant injector;
receiving, by the controller, a second $NO_x$ amount signal from a second $NO_x$ sensor indicative an amount of $NO_x$ gases at a location downstream of the SCR unit;
determining, by the controller, an amount of reductant that has been inserted into the aftertreatment system by the reductant injector;
determining, by the controller, an estimated amount of reductant deposits formed in the aftertreatment system based on at least the first $NO_x$ amount signal, the second $NO_x$ amount signal, and the amount of reductant that has been inserted into the aftertreatment system; and
adjusting, by the controller, an amount of reductant to be inserted into the aftertreatment system based on the estimated amount of reductant deposits formed in the aftertreatment system.

13. The method of claim 12, further comprising:
in response to the amount of reductant deposits formed in the aftertreatment system being equal to or greater than a threshold amount, causing, by the controller, a hydrocarbon insertion assembly to insert hydrocarbons into the aftertreatment system to increase a temperature of the aftertreatment system to a regeneration temperature for removing the reductant deposits.

14. The method of claim 12, wherein the estimated amount of reductant deposits is determined, by the controller, using the following equation:

$$R_D = R_I - R_{(INOx-ONOx)}$$

where, $R_D$ is the amount of reductant deposits formed in the aftertreatment system, $R_I$ is the amount of reductant that has been inserted into the aftertreatment system, and $R_{(INOx-ONOx)}$ is an amount of reductant that would be consumed to reduce the amount of $NO_x$ gases measured by the first $NO_x$ sensor to the amount of $NO_x$ gases measured by the second $NO_x$ sensor.

15. The method of claim 12, further comprising:
determining, by the controller, an ammonia slip parameter; and
determining, by the controller, the estimated amount of reductant deposits formed in the aftertreatment system based on at least the first $NO_x$ amount signal, the second $NO_x$ amount signal, the amount of reductant that has been inserted into the aftertreatment system by the reductant injector, and the ammonia slip parameter.

16. The method of claim 15, wherein the estimated amount of reductant deposits is determined, by the controller, using the following equation:

$$R_D = R_I - R_{(INOx-ONOx)} * ASP$$

where, $R_D$ is the amount of reductant deposits formed in the aftertreatment system, $R_I$ is the amount of reductant that has been inserted into the aftertreatment system, ASP is the ammonia slip parameter, and $R_{(INOx-ONOx)} * ASP$ is an amount of reductant that would be consumed to reduce the amount of $NO_x$ gases measured by the first $NO_x$ sensor to the amount of $NO_x$ gases measured by the second $NO_x$ sensor.

17. The method of claim 12, wherein the estimated amount of reductant deposits is determined, by the controller, based also on a catalytic conversion efficiency of the SCR unit.

18. A method for estimating an amount of reductant deposits formed in an aftertreatment system comprising a reductant injector and a SCR unit located downstream of the reductant injector, the method comprising:
determining, by a controller, an average $NO_x$ amount over time of $NO_x$ gases included in an exhaust gas flowing through the aftertreatment system downstream of the SCR unit;
determining, by the controller, whether the average $NO_x$ amount is equal to or greater than a threshold;
in response to the average $NO_x$ amount being equal to or greater than the threshold, determining, by the controller, that ammonia slip is occurring;
determining, by the controller, an ammonia slip parameter;
estimating, by the controller, the amount of reductant deposits formed in the aftertreatment system based on at least an amount of $NO_x$ gases measured at the location upstream of the reductant injector, an amount of $NO_x$ gases measured at the location downstream of the SCR unit, an amount of reductant that has been inserted into the aftertreatment system by the reductant injector, and the ammonia slip parameter; and
adjusting, by the controller, an amount of reductant to be inserted into the aftertreatment system based on the estimated amount of reductant deposits formed in the aftertreatment system.

19. The method of claim 18, wherein the estimated amount of reductant deposits is determined, by the controller, using the following equation:

$$R_D = R_I - R_{(INOx-ONOx)} * ASP$$

where, $R_D$ is the amount of reductant deposits formed in the aftertreatment system, $R_I$ is the amount of reductant that has been inserted into the aftertreatment system, ASP is the ammonia slip parameter, and $R_{(INOx-ONOx)} * ASP$ is an amount of reductant that would be consumed to reduce the amount of $NO_x$ gases measured at the location upstream of the reductant injector to the amount of $NO_x$ gases measured at the location downstream of the SCR unit.

20. The method of claim 18, further comprising:
in response to the average $NO_x$ amount being less than the threshold, determining, by the controller, whether a $NO_x$ amount in the exhaust gas downstream of the SCR unit increases to be equal to or greater than the threshold;
in response to the NOx amount increasing to be equal to or greater than the threshold, determining, by the controller, if the $NO_x$ amount returns to the average $NO_x$ amount within a predetermined time; and
in response to the $NO_x$ amount not returning to the average $NO_x$ amount within the predetermined time, determining, by the controller, that ammonia slip is occurring.

* * * * *